United States Patent
Yoon et al.

(10) Patent No.: US 11,442,851 B2
(45) Date of Patent: Sep. 13, 2022

(54) PROCESSING-IN-MEMORY AND METHOD AND APPARATUS WITH MEMORY ACCESS

(71) Applicant: SAMSUNG ELECTRONICS CO., LTD., Suwon-si (KR)

(72) Inventors: Hosang Yoon, Yongin-si (KR); Seungwon Lee, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/201,539

(22) Filed: Mar. 15, 2021

(65) Prior Publication Data
US 2022/0075713 A1   Mar. 10, 2022

(51) Int. Cl.
G06F 12/00  (2006.01)
G06F 12/02  (2006.01)
G06F 12/1045  (2016.01)
G06F 9/30  (2018.01)

(52) U.S. Cl.
CPC ...... G06F 12/0238 (2013.01); G06F 9/30047 (2013.01); G06F 9/30101 (2013.01); G06F 12/1054 (2013.01); G06F 12/1063 (2013.01)

(58) Field of Classification Search
CPC ............ G06F 12/0238; G06F 12/1054; G06F 9/30101; G06F 9/30047; G06F 12/1063
See application file for complete search history.

(56) References Cited

U.S. PATENT DOCUMENTS

| | | | |
|---|---|---|---|
| 7,859,541 B2 | 12/2010 | Montrym et al. | |
| 8,261,041 B2 | 9/2012 | Kunimatsu | |
| 9,239,799 B2 | 1/2016 | Ingle et al. | |
| 10,169,261 B1 | 1/2019 | Steinmacher-Burow | |
| 2012/0297139 A1* | 11/2012 | Choi | G06F 12/1009 711/E12.024 |
| 2019/0324914 A1* | 10/2019 | Xiao | G06F 12/1027 |

FOREIGN PATENT DOCUMENTS

| | | |
|---|---|---|
| KR | 2002-0060419 A | 7/2002 |
| KR | 10-1805028 B1 | 12/2017 |
| KR | 10-2018-0017096 A | 2/2018 |
| KR | 10-2019-0097528 A | 8/2019 |
| KR | 10-2020-0013461 A | 2/2020 |

* cited by examiner

Primary Examiner — Gurtej Bansal
(74) Attorney, Agent, or Firm — NSIP Law

(57) ABSTRACT

A processing-in-memory includes: a memory; a register configured to store offset information; and an internal processor configured to: receive an instruction and a reference physical address of the memory from a memory controller, determine an offset physical address of the memory based on the offset information, determine a target physical address of the memory based on the reference physical address and the offset physical address, and perform the instruction by accessing the target physical address.

17 Claims, 4 Drawing Sheets

PROCESSING-IN-MEMORY AND METHOD AND APPARATUS WITH MEMORY ACCESS

CROSS-REFERENCE TO RELATED APPLICATIONS

This application claims the benefit under 35 USC § 119(a) of Korean Patent Application No. 10-2020-0114582 filed on Sep. 8, 2020, in the Korean Intellectual Property Office, the entire disclosure of which is incorporated herein by reference for all purposes.

BACKGROUND

1. Field

The following description relates to a processing-in-memory, and method and apparatus with memory access.

2. Description of Related Art

In a von Neumann architecture, data may be stored in a memory. The memory may be separate from a processor, and data may move therebetween. In this structure, an inevitable delay occurs due to frequent data movements. Although the memory may be improved with an increase in the speed of the processor, the improvement may not be in the transmission rate, but instead in the capability to store more data in a smaller space. When the waiting time required for fetching data from the memory to the processor increases, the speed of the processor may be limited to the transmission rate at a bottleneck. As such, a von Neumann bottleneck, where the throughput is limited due to the waiting time, may occur in the computer architecture.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processing-in-memory includes: a memory; a register configured to store offset information; and an internal processor configured to: receive an instruction and a reference physical address of the memory from a memory controller, determine an offset physical address of the memory based on the offset information, determine a target physical address of the memory based on the reference physical address and the offset physical address, and perform the instruction by accessing the target physical address.

The processing-in-memory may include: a cache configured to store the offset information and the target physical address.

The internal processor may be configured to: search the cache based on the offset information, and perform the instruction by accessing the target physical address in response to the target physical address corresponding to the offset information being found in the cache by the search.

For the determining of the target physical address, the internal processor may be configured to: determine the target physical address based on the reference physical address and the offset physical address in response to the target physical address corresponding to the offset information not being found in the cache by the search.

For the performing of the instruction, the internal processor may be configured to perform a processing-in-memory (PIM) operation based on information stored in the memory at the target physical address.

The reference physical address may correspond to an absolute location in the memory, and the offset physical address may correspond to a relative location indicating a distance to the reference physical address in the memory.

A memory access apparatus may include: the processing-in-memory; the memory controller; an external processor configured to transmit the offset information to the processing-in-memory; and a memory management unit (MMU) configured to transmit the reference physical address to the memory controller.

In another general aspect, a memory access apparatus includes: a processing-in-memory comprising an internal processor, a memory, and a register; a memory controller; an external processor; and a memory management unit (MMU), wherein the external processor is configured to transmit offset information to the processing-in-memory, transmit an instruction to the memory controller, and transmit a reference virtual address to the MMU, wherein the MMU is configured to convert the reference virtual address into a reference physical address of the memory, and transmit the reference physical address to the memory controller, wherein the register is configured to store the transmitted offset information, and wherein the internal processor is configured to: receive the instruction and the reference physical address from the memory controller, determine an offset physical address of the memory based on the offset information, determine a target physical address of the memory based on the reference physical address and the offset physical address, and perform the instruction by accessing the target physical address.

The processing-in-memory may include a cache configured to store the offset information and the target physical address.

The internal processor may be configured to: search the cache based on the offset information, and perform the instruction by accessing the target physical address in response to the target physical address corresponding to the offset information being found in the cache by the search.

In another general aspect, a memory access method of a processing-in-memory includes: receiving, by an internal processor, an instruction and a reference physical address of a memory from a memory controller; determining, by the internal processor, an offset physical address of the memory based on offset information stored in a register; determining, by the internal processor, a target physical address of the memory based on the reference physical address and the offset physical address; and performing, by the internal processor, the instruction by accessing the target physical address.

The method may include: storing the offset information and the target physical address in a cache included in the processing-in-memory.

The method may include: searching, by the internal processor, the cache based on the offset information; and performing, by the internal processor, the instruction by accessing the target physical address in response to the target physical address corresponding to the offset information being found in the cache by the search.

A non-transitory computer-readable storage medium may store instructions that, when executed by an external processor, configure the external processor to perform the method.

In another general aspect, a memory access method of a processing apparatus includes: transmitting, by an external processor, offset information to a processing-in-memory, transmitting an instruction to a memory controller, and transmitting a reference virtual address to a memory management unit (MMU); converting, by the MMU, the reference virtual address into a reference physical address of a memory, and transmitting, by the MMU, the reference physical address to the memory controller; storing, by a register, the offset information; receiving, by an internal processor, the instruction and the reference physical address from the memory controller; determining, by the internal processor, an offset physical address of the memory based on the offset information; determining, by the internal processor, a target physical address of the memory based on the reference physical address and the offset physical address; and performing, by the internal processor, the instruction by accessing the target physical address.

The method may include: storing, by a cache included in the processing-in-memory, the offset information and the target physical address.

The method may include: searching, by the internal processor, the cache based on the offset information; and performing, by the internal processor, the instruction by accessing the target physical address in response to the target physical address corresponding to the offset information being found in the cache by the search.

Other features and aspects will be apparent from the following detailed description, the drawings, and the claims.

Figure 1:
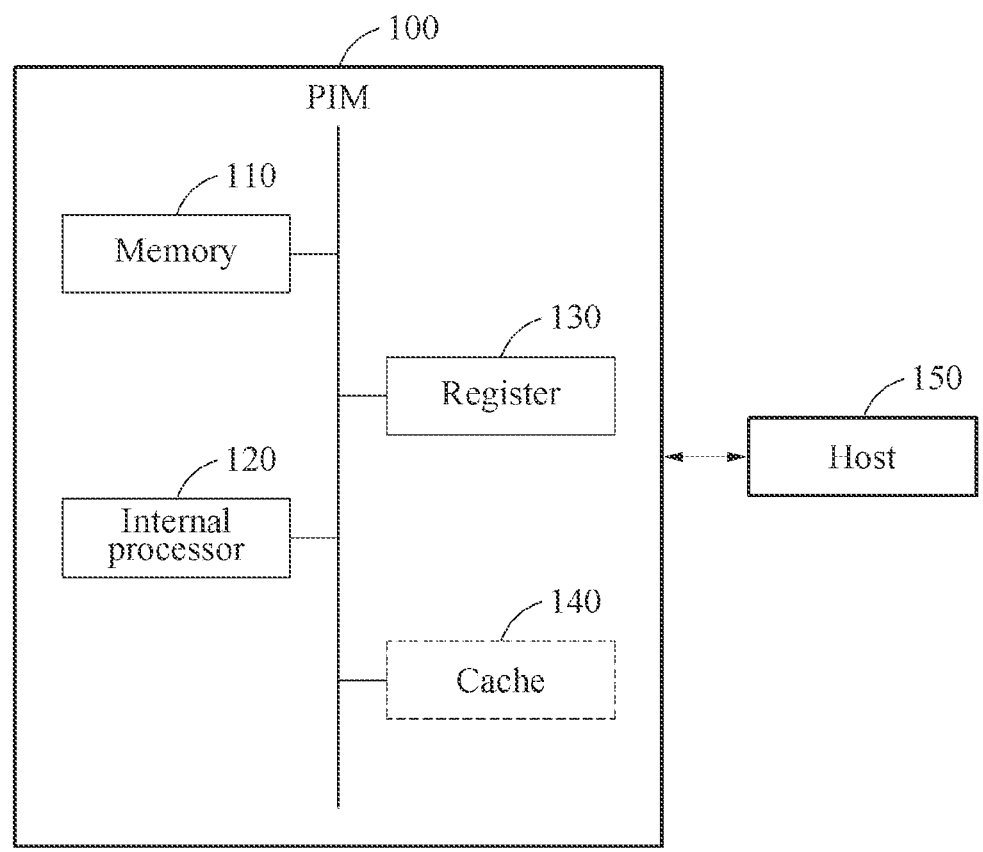
FIG. 1 illustrates an example of an overall configuration of a processing-in-memory.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Hereinafter, examples will be described in detail with reference to the accompanying drawings. However, various alterations and modifications may be made to the examples. Here, the examples are not construed as limited to the disclosure. The examples should be understood to include all changes, equivalents, and replacements within the idea and the technical scope of the disclosure.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms including technical and scientific terms used herein have the same meaning as commonly understood by one of ordinary skill in the art to which this disclosure pertains consistent with and after an understanding of the present disclosure. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The same name may be used to describe an element included in the examples described above and an element having a common function. Unless otherwise mentioned, the descriptions on the examples may be applicable to the following examples and thus, duplicated descriptions will be omitted for conciseness.

FIG. 1 illustrates an example of an overall configuration of a processing-in-memory.

A processing-in-memory 100 may quickly access a memory 110 by quickly calculating a target physical address of the memory 110. Through this, the processing-in-memory 100 may quickly perform a PIM (processing in memory) operation stored in a predetermined address of the memory 110, and thus may solve a von Neumann bottleneck of a typical von Neumann architecture.

The processing-in-memory 100 may be implemented as a semiconductor chip. The processing-in-memory 100 may be disposed inside another semiconductor. For example, the processing-in-memory 100 may be mounted inside a semiconductor chip such as a graphics processing unit (GPU) or a mobile processor. However, examples are not limited thereto. The processing-in-memory 100 may be applied to all devices using a memory.

In order to access a memory, a physical address of the memory may be determined and accessed. Thus, the physical address of the memory may be calculated to access the memory. Address information may be calculated when a reference physical address and an offset physical address are known. Here, the reference physical address may be or refer to an absolute location in the memory, and the offset physical address may be or refer to a relative location indicating a distance to the reference physical address. The offset physical address may be calculated based on offset information, and the offset information may be basic information for calculating the offset physical address. The offset information may include information such as a rank, a channel, a bank, a row, and/or a column of the memory.

When a typical processing-in-memory uses external instructions (e.g., software instructions) to access the memory of the processing-in-memory, multiple offset information may be transmitted to an external processor and a calculation may be performed based on the transmitted information. When the number of accesses to the memory of the processing-in-memory increases, overhead may likewise increase in the calculation of an offset address.

Meanwhile, a memory management unit (MMU) may be a device configured to convert a virtual address into a physical address. When an MMU is typically used to access the memory of the processing-in-memory, it may be difficult to calculate the physical address from offset information due to the characteristic of the MMU that converts the virtual address into the physical address.

In contrast, the processing-in-memory 100 of one or more embodiments may calculate the physical address (e.g., a target physical address) of the memory 110 through the internal processor 120. When the processing-in-memory 100 of one or more embodiments calculates the physical address using the offset information stored in a register 130 in the processing-in-memory 100, overhead may be reduced.

The processing-in-memory 100 may generate a read or write instruction of the memory 110 for the PIM operation. For the PIM operation, first, the target physical address of the memory 110 may be calculated to determine an address of the memory 110 to be accessed.

The processing-in-memory 100 may calculate the target physical address of the memory 110 to be accessed, through the internal processor 120 of the processing-in-memory 100.

The internal processor 120 may be manufactured to be configured to perform the calculation of the target physical address. The processing-in-memory 100 of one or more embodiments may calculate the target physical address using the internal processor 120 of the processing-in-memory 100 manufactured and configured to perform the calculation of the target physical address, rather than using separate or external instructions (e.g., software instructions) as done by the typical processing-in-memory. Through this, the processing-in-memory 100 of one or more embodiments may increase the speed of the PIM operation and at the same time accelerate the calculation of the target physical address.

To achieve the foregoing speed increase and calculation acceleration, the processing-in-memory 100 may include the memory 110, the internal processor 120, and the register 130. Simple data, or operator and operand information for the PIM operation may be stored at each address of the memory 110.

The register 130 may store offset information, which may be information used for calculating the target physical address of the memory 110. The register 130 may transmit the offset information to the internal processor 120 in response to a request signal. Here, the transmitted offset information may be a rank, a channel, a bank, a row, and/or a column of the memory 110. The offset information may be expressed as a variable.

The internal processor 120 may receive an instruction (e.g., the read or write instruction) and the reference physical address of the memory 110 from a memory controller. The internal processor 120 may receive the offset information from the register 130. When the offset information is received, the internal processor 120 may calculate an offset physical address of the memory 110 based on the offset information.

The internal processor 120 may calculate the target physical address to be accessed using the offset physical address and the reference physical address. When the target physical address is calculated, the processing-in-memory 100 may access the memory 110 at a location to be used for the PIM operation.

Thereafter, the internal processor 120 may perform (or execute) the instruction by accessing the target physical address. The processing-in-memory 100 may perform the read or write instruction by accessing the memory 110 at the target physical address. The PIM operation may be performed according to the content stored at the target physical address on which the instruction is performed.

In another example, the processing-in-memory 100 may further include a cache 140. The processing-in-memory 100 may store the calculated target physical address in the cache 140. The cache 140 may store the offset information and the target physical address.

In response to a request for access to the memory 110 from a host 150, the processing-in-memory 100 may first search the cache 140. The internal processor 120 may search the cache 140 based on the offset information. When a target physical address corresponding to the offset information is found in the cache 140 by the search, the internal processor 120 may perform the instruction by accessing the target physical address.

When a target physical address corresponding to the request for access is found, the processing-in-memory 100 may access the found target physical address, thereby more efficiently processing the request for access to the memory 110. When a target physical address corresponding to the request for access is not found by the search, the processingin-memory 100 may calculate the target physical address through the internal processor 120 and access the calculated target physical address.

As such, when the cache 140 is applied, the memory 110 may be directly accessed through the cache 140 even when an address that is repeatedly accessed or an address adjacent thereto is not directly calculated. Thus, the performing speed may be further increased.

Figure 2:
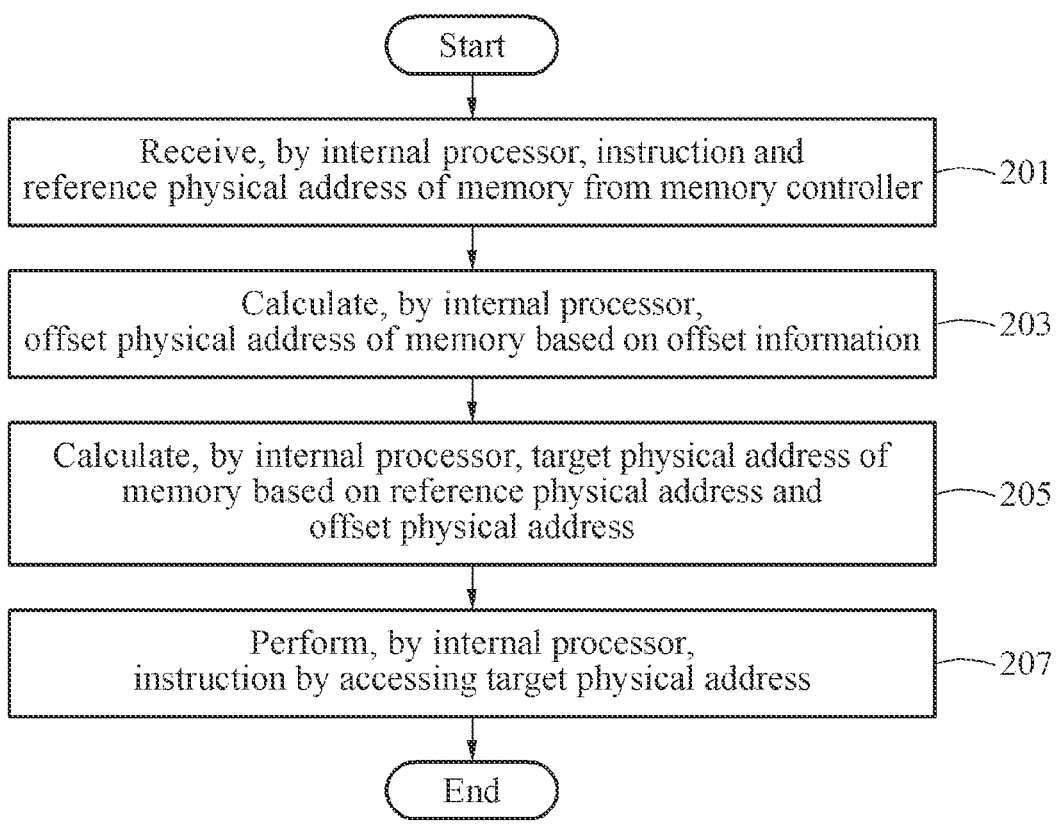
FIG. 2 illustrates an example of a memory access method performed by a processing-in-memory.

FIG. 2 illustrates an example of a memory access method performed by a processing-in-memory (e.g., the processing-in-memory 100).

In operation 201, an internal processor may receive an instruction and a reference physical address of a memory from a memory controller. The reference physical address may be or refer to a physical address that is used for reference to calculate a target physical address to be accessed. The instruction may include a command such as read or write information stored in the memory.

In operation 203, the internal processor may calculate an offset physical address of the memory based on offset information. The offset information may be transferred from an external host to a register and stored in the register. In response to a request for access to the memory, the internal processor may receive the offset information from the register. The internal processor may calculate the offset physical address based on the offset information.

In operation 205, the internal processor may calculate a target physical address of the memory based on the reference physical address and the offset physical address. The offset physical address may be a relative address indicating a distance from the reference physical address to the target physical address. The internal processor may calculate the target physical address based on the reference physical address that is an absolute address and the offset physical address that is a relative address.

In operation 207, the internal processor may perform the instruction by accessing the target physical address. For example, the internal processor may execute a command such as read or write (e.g., of the instruction) by accessing the target physical address. Simple data or operator and operand information may be included at the target physical address. In the latter case, a PIM operation may be performed according to the included information.

In another example, the internal processor may store the offset information and the target physical address in a cache included in the processing-in-memory. In response to a request for access to the memory, the internal processor may first search the cache based on the offset information. When a target physical address corresponding to the offset information is found in the cache, the internal processor may perform the instruction by accessing the target physical address.

Figure 3:
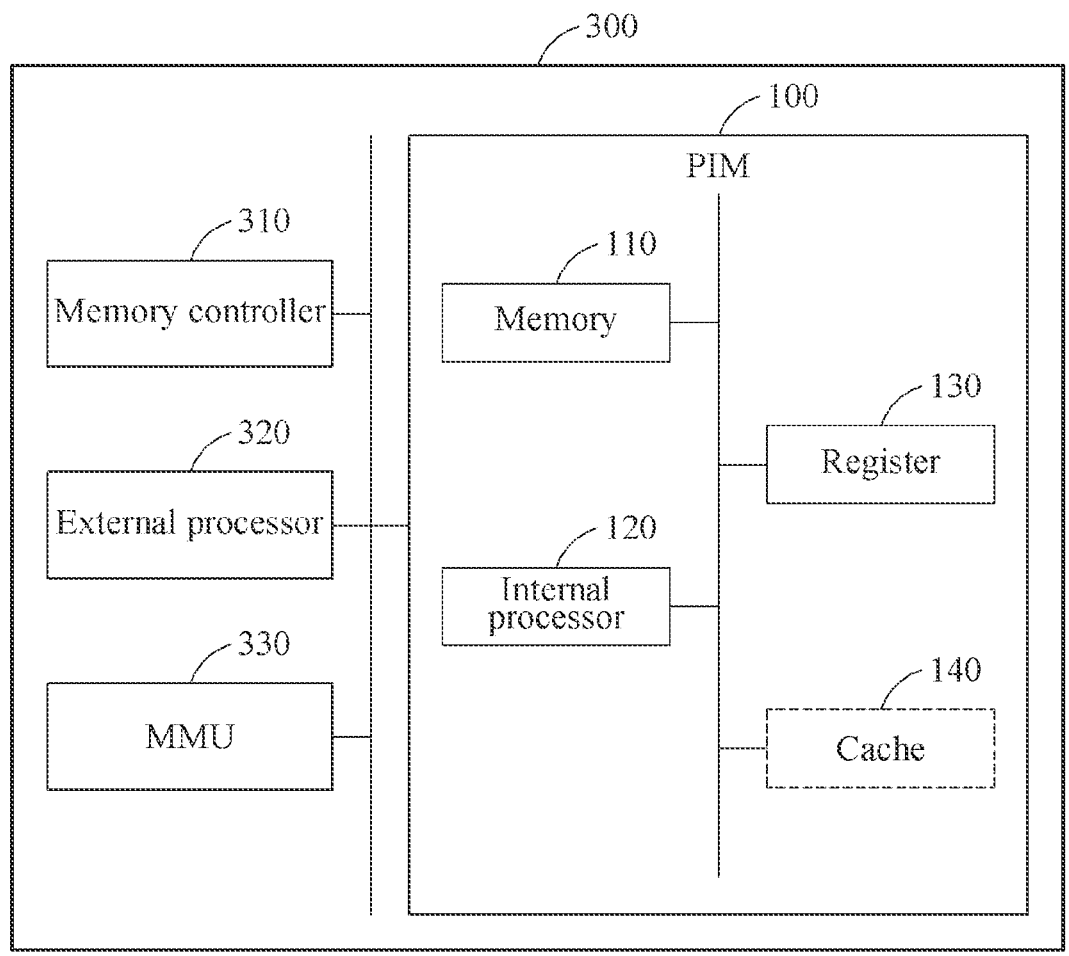
FIG. 3 illustrates an example of an overall configuration of a memory access apparatus.

FIG. 3 illustrates an example of an overall configuration of a memory access apparatus.

A memory access apparatus 300 may include the processing-in-memory 100, and a physical address of the memory 110 may be calculated through the internal processor 120 in the processing-in-memory 100. When the memory access apparatus 300 calculates the physical address using offset information stored in the register 130 in the processing-in-memory 100, overhead may be reduced.

The memory access apparatus 300 may generate a read or write instruction of the memory 110 for a PIM operation. For the PIM operation, first, a target physical address of the memory 110 may be calculated to determine an address of the memory 110 to be accessed.

The memory access apparatus 300 may calculate the target physical address of the memory 110 to be accessed, through the internal processor 120 of the processing-in-memory 100. The internal processor 120 may be manufactured to be configured to perform the calculation of the target physical address. The processing-in-memory 100 of one or more embodiments may calculate the target physical address using the internal processor 120 of the processing-in-memory 100 manufactured and configured to perform the calculation of the target physical address, rather than using separate or external instructions (e.g., software instructions) as done by the typical processing-in-memory. Through this, the memory access apparatus 300 of one or more embodiments may increase the speed of the PIM operation and at the same time accelerate the calculation of the target physical address.

To achieve the foregoing speed increase and calculation acceleration, the memory access apparatus 300 may include the processing-in-memory 100, a memory controller 310, an external processor 320, and an MMU 330. The processing-in-memory 100 may include the memory 110, the internal processor 120, and the register 130. The memory access apparatus 300 may include all types of devices including the processing-in-memory 100, the memory controller 310, the external processor 320, and the MMU 330. For example, the memory access apparatus 300 may include a mobile terminal, a computer, and/or a server.

Simple data, or operator and operand information for the PIM operation may be stored at each address of the memory 110. The register 130 may store offset information, which may be information used for calculating the target physical address of the memory 110. The register 130 may transmit the offset information to the internal processor 120 in response to a request signal.

The external processor 320 may perform various operations according to the purpose of the memory access apparatus 300. The external processor 320 may transfer the offset information to the register 130. The external processor 320 may transmit a reference virtual address to the MMU 330. The external processor 320 may transmit an instruction (e.g., the read or write instruction) to the memory controller 310. The MMU 330 may convert the reference virtual address into a reference physical address and transmit the reference physical address to the internal processor 120 (e.g., through the memory controller 310).

The internal processor 120 may receive the instruction and the reference physical address of the memory 110 from a memory controller 310. The internal processor 120 may receive the offset information from the register 130. When the offset information is received, the internal processor 120 may calculate an offset physical address of the memory 110 based on the offset information.

The internal processor 120 may calculate the target physical address to be accessed using the offset physical address and the reference physical address. When the target physical address is calculated, the processing-in-memory 100 may access the memory 110 at a location to be used for the PIM operation.

Thereafter, the internal processor 120 may perform (or execute) the instruction by accessing the target physical address. The processing-in-memory 100 may perform the read or write instruction by accessing the memory 110 at the target physical address. The PIM operation may be performed according to the content stored at the target physical address on which the instruction is performed.

In another example, the memory access apparatus 300 may further include the cache 140. The memory access apparatus 300 may store the calculated target physical address in the cache 140. The cache 140 may store the offset information and the target physical address.

In response to a request for access to the memory 110 from a host, the memory access apparatus 300 may first search the cache 140. The internal processor 120 may search the cache 140 based on the offset information. When a target physical address corresponding to the offset information is found in the cache 140, the internal processor 120 may perform the instruction by accessing the target physical address.

When a target physical address corresponding to the request for access is found, the memory access apparatus 300 may access the found target physical address, thereby more efficiently processing the request for access to the memory. When a target physical address corresponding to the request for access is not found, the memory access 300 apparatus may calculate the target physical address through the internal processor 120 and access the calculated target physical address.

As such, when the cache 140 is applied, the memory 110 may be directly accessed through the cache 140 even when an address that is repeatedly accessed or an address adjacent thereto is not directly calculated. Thus, the performing speed may be further increased.

Figure 4:
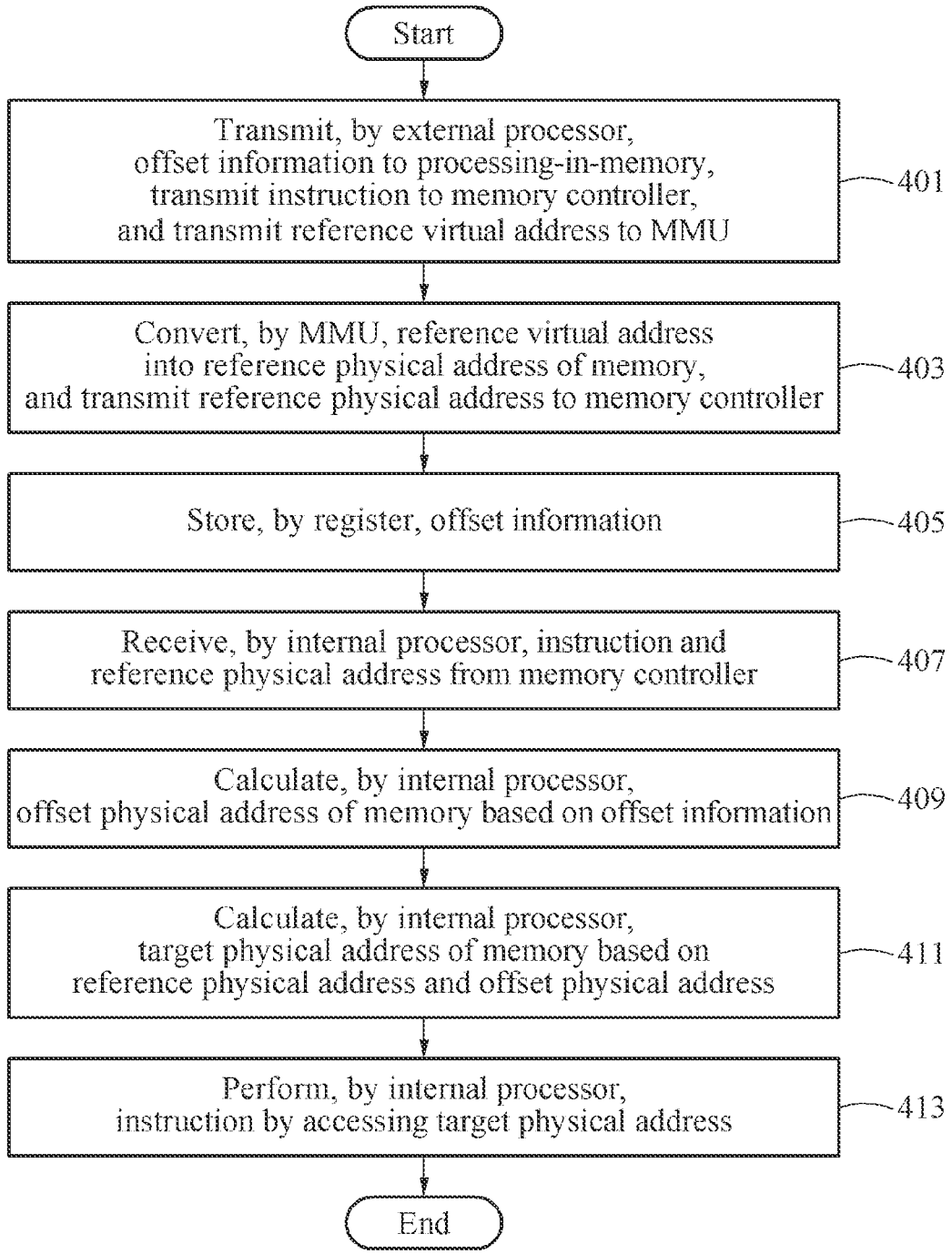
FIG. 4 illustrates an example of a memory access method performed by a memory access apparatus.

FIG. 4 illustrates an example of a memory access method performed by a memory access apparatus (e.g., the memory access apparatus 300).

In operation 401, an external processor of a memory access apparatus may transmit offset information to a processing-in-memory (e.g., to a register), transmit an instruction to a memory controller, and transmit a reference virtual address to an MMU.

In operation 403, the MMU of the memory access apparatus may convert the reference virtual address into a reference physical address of the memory, and transmit the reference physical address to the memory controller.

In operation 405, the register of the memory access apparatus may store the offset information. The register may transmit the offset information to an internal processor in response to an access request signal.

In operation 407, the internal processor may receive the instruction and the reference physical address of the memory from the memory controller. The reference physical address may be or refer to a physical address that is used for reference to calculate a target physical address to be accessed. The instruction may include a command such as read or write information stored in the memory.

In operation 409, the internal processor may calculate an offset physical address of the memory based on the offset information. The offset information may be transferred from an external host to the register and stored in the register. In response to a request for access to the memory (e.g., the access request signal), the internal processor may receive the offset information from the register. The internal processor may calculate the offset physical address based on the offset information.

In operation 411, the internal processor may calculate a target physical address of the memory based on the reference physical address and the offset physical address. The offset physical address may be a relative address indicating a distance from the reference physical address to the target physical address. The internal processor may calculate the target physical address based on the reference physical address that is an absolute address and the offset physical address that is a relative address.

In operation 413, the internal processor may perform the instruction by accessing the target physical address. For example, the internal processor may execute a command such as read or write (e.g., of the instruction0 by accessing the target physical address. Simple data or operator and operand information may be included at the target physical address. In the latter case, a PIM operation may be performed according to the included information.

In another example, the internal processor may store the offset information and the target physical address in a cache included in the processing-in-memory. In response to a request for access to the memory, the internal processor may first search the cache based on the offset information. When a target physical address corresponding to the offset information is found in the cache, the internal processor may perform the instruction by accessing the target physical address.

The processing-in-memories, memories, internal processors, registers, caches, hosts, memory access apparatuses, memory controllers, external processors, MMUs, processing-in-memory 100, memory 110, internal processor 120, register 130, cache 140, host 150, memory controller 310, external processor 320, MMU 330, and other apparatuses, devices, units, modules, and components described herein with respect to FIGS. 1-4 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-4 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processing-in-memory, comprising:
a memory;
a register configured to store offset information; and
an internal processor configured to:
  receive an instruction and a reference physical address of the memory from a memory controller,
  determine an offset physical address of the memory based on the offset information,
  determine a target physical address of the memory based on the reference physical address and the offset physical address, and
  perform the instruction by accessing the target physical address.

2. The processing-in-memory of claim 1, further comprising:
a cache configured to store the offset information and the target physical address.

3. The processing-in-memory of claim 2, wherein the internal processor is further configured to:
search the cache based on the offset information, and
perform the instruction by accessing the target physical address in response to the target physical address corresponding to the offset information being found in the cache by the search.

4. The processing-in-memory of claim 3, wherein, for the determining of the target physical address, the internal processor is further configured to:
determine the target physical address based on the reference physical address and the offset physical address in response to the target physical address corresponding to the offset information not being found in the cache by the search.

5. The processing-in-memory of claim 1, wherein, for the performing of the instruction, the internal processor is further configured to perform a processing-in-memory (PIM) operation based on information stored in the memory at the target physical address.

6. The processing-in-memory of claim 1, wherein the reference physical address corresponds to an absolute location in the memory, and the offset physical address corresponds to a relative location indicating a distance to the reference physical address in the memory.

7. A memory access apparatus, comprising:
the processing-in-memory of claim 1;
the memory controller of claim 1;
an external processor configured to transmit the offset information of claim 1 to the processing-in-memory of claim 1; and
a memory management unit (MMU) configured to transmit the reference physical address of claim 1 to the memory controller of claim 1.

8. A memory access apparatus, comprising:
a processing-in-memory comprising an internal processor, a memory, and a register;
a memory controller;
an external processor; and
a memory management unit (MMU),
wherein the external processor is configured to transmit offset information to the processing-in-memory, transmit an instruction to the memory controller, and transmit a reference virtual address to the MMU,
wherein the MMU is configured to convert the reference virtual address into a reference physical address of the memory, and transmit the reference physical address to the memory controller,
wherein the register is configured to store the transmitted offset information, and
wherein the internal processor is configured to:
receive the instruction and the reference physical address from the memory controller,
determine an offset physical address of the memory based on the offset information,
determine a target physical address of the memory based on the reference physical address and the offset physical address, and
perform the instruction by accessing the target physical address.

9. The apparatus of claim 8, wherein the processing-in-memory further comprises a cache configured to store the offset information and the target physical address.

10. The apparatus of claim 9, wherein the internal processor is further configured to:
search the cache based on the offset information, and
perform the instruction by accessing the target physical address in response to the target physical address corresponding to the offset information being found in the cache by the search.

11. A memory access method of a processing-in-memory, the method comprising:
receiving, by an internal processor, an instruction and a reference physical address of a memory from a memory controller;
determining, by the internal processor, an offset physical address of the memory based on offset information stored in a register;
determining, by the internal processor, a target physical address of the memory based on the reference physical address and the offset physical address; and
performing, by the internal processor, the instruction by accessing the target physical address.

12. The method of claim 11, further comprising:
storing the offset information and the target physical address in a cache included in the processing-in-memory.

13. The method of claim 12, further comprising:
searching, by the internal processor, the cache based on the offset information; and
performing, by the internal processor, the instruction by accessing the target physical address in response to the target physical address corresponding to the offset information being found in the cache by the search.

14. A non-transitory computer-readable storage medium storing instructions that, when executed by an external processor, configure the external processor to perform the method of claim 11.

15. A memory access method of a processing apparatus, the method comprising:
transmitting, by an external processor, offset information to a processing-in-memory, transmitting an instruction to a memory controller, and transmitting a reference virtual address to a memory management unit (MMU);
converting, by the MMU, the reference virtual address into a reference physical address of a memory, and transmitting, by the MMU, the reference physical address to the memory controller;
storing, by a register, the offset information;
receiving, by an internal processor, the instruction and the reference physical address from the memory controller;
determining, by the internal processor, an offset physical address of the memory based on the offset information;
determining, by the internal processor, a target physical address of the memory based on the reference physical address and the offset physical address; and
performing, by the internal processor, the instruction by accessing the target physical address.

16. The method of claim 15, further comprising:
storing, by a cache included in the processing-in-memory, the offset information and the target physical address.

17. The method of claim 16, further comprising:
searching, by the internal processor, the cache based on the offset information; and
performing, by the internal processor, the instruction by accessing the target physical address in response to the target physical address corresponding to the offset information being found in the cache by the search.

* * * * *